(12) United States Patent
Quere (10) Patent No.: US 10,574,019 B2
(45) Date of Patent: Feb. 25, 2020

(54) METHOD AND SYSTEM FOR CONTROLLING THE SPEED OF A LASER PULSE

(71) Applicant: COMMISSARIAT A L'ENERGIE ATOMIQUE ET AUX ENERGIES ALTERNATIVES, Paris (FR)

(72) Inventor: Fabien Quere, Velizy-Villacoublay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 93 days.

(21) Appl. No.: 16/007,686

(22) Filed: Jun. 13, 2018

(65) Prior Publication Data

US 2018/0358771 A1     Dec. 13, 2018

(30) Foreign Application Priority Data

Jun. 13, 2017    (FR) ..................................... 17 55297

(51) Int. Cl.
| | |
|---|---|
| G02B 26/00 | (2006.01) |
| G02F 1/01 | (2006.01) |
| H01S 3/00 | (2006.01) |
| G02B 27/10 | (2006.01) |
| G02F 1/133 | (2006.01) |
| G01J 7/00 | (2006.01) |
| H05H 15/00 | (2006.01) |
| G01J 11/00 | (2006.01) |

(52) U.S. Cl.
CPC ............ *H01S 3/0085* (2013.01); *G01J 7/00* (2013.01); *G02B 27/1086* (2013.01); *G02F 1/13306* (2013.01); *H01S 3/0014* (2013.01); *H01S 3/0057* (2013.01); *G01J 11/00* (2013.01); *G02F 2203/50* (2013.01); *H05H 15/00* (2013.01)

(58) Field of Classification Search
CPC ....................... G02B 27/1086; G02F 2203/50; H01S 3/0057
USPC .................................. 359/238, 279, 333, 337
See application file for complete search history.

(56) References Cited

FOREIGN PATENT DOCUMENTS

WO     2012/164483 A1    12/2012

OTHER PUBLICATIONS

Weiner, "Femtosecond pulse shaping using spatial light modulations", Review of Scientific Instruments, AIP, Melville, NY, US, vol. 71, No. 5, (May 1, 2000), pp. 1929-1960, XP012038262.
Sainte-Marie, et al., "Controlling the velocity of ultrashort light pulses in vacuum through spatio-temporal couplings", Optica, vol. 4, No. 10, Oct. 20, 2017 (Oct. 20, 2017), p. 1298, XP055477286.

(Continued)

*Primary Examiner* — Mahidere S Sahle
(74) *Attorney, Agent, or Firm* — Baker & Hostetler LLP (57) ABSTRACT

A method for controlling the speed of a laser pulse includes a step of applying a chirp to the pulse; and a step of focusing the pulse by means of an optical system having a longitudinal chromatic aberration; whereby an intensity peak of the pulse moves along a propagation axis following, over a finite propagation length, a speed profile dependent on the chirp and on the longitudinal chromatic aberration. The use of such a method for accelerating particles via laser, and a system for implementing such a method, are also provided.

11 Claims, 5 Drawing Sheets

(56) References Cited

OTHER PUBLICATIONS

Sun, et al., "Pulse front adaptative optics: a new method for control of ultrashort laser pulses", Optics Express vol. 23, No. 15, pp. 19348-19357, (2015).
Vincenti, et al., "Altosecond lighthouses: how to use spatiotemporally coupled light fields to generate isolated attosecond pulses", Phys. Rev. Lett. 108, 113904 (2012).
Kondakci, et al., "Diffraction-free pulsed optical beams via space-time correlations", Optics Express, vol. 24, Issue 25, pp. 28659-28668, (2016).
Oron, et al., "Scanningless depthresolved microscopy", Optics Express, vol. 13, Issue 5, pp. 1468-1476, (2005).
Milonni, "Controlling the speed of light pulses", Journal of Physics B: Atomic, Molecular and Optical Physics, 35 (2002).
Esarey, et al., "Physics of laser-driven plasma-based electron accelerators", Reviews of Modern Physics, Vo. 81, Jul.-Sep. 2009.

METHOD AND SYSTEM FOR CONTROLLING THE SPEED OF A LASER PULSE

This application claims priority to foreign French patent application No. FR 1755297, filed on Jun. 13, 2017, the disclosure of which is incorporated by reference in its entirety.

FIELD OF THE INVENTION

The invention relates to a method for controlling the speed of a laser pulse and to a system for implementing such a method. The invention relates to the technical field of ultrafast optics, which is concerned with generating, manipulating and using laser pulses having a duration that is shorter than or equal to a few picoseconds (1 ps=$10^{-12}$ s) or tens of picoseconds at most.

BACKGROUND

Under ordinary conditions it is considered that, in a vacuum, a laser pulse propagates without deformation and at the speed of light (c). In dispersive media, the pulse most often propagates at a speed slower than c, and its temporal profile varies over the course of propagation. However, by making use of media exhibiting abnormal dispersion, non-linear behavior or gain, it is possible to decrease the speed of propagation of a pulse by a very large amount, or even to stop it, or conversely to make it much faster than c (without however breaking the rules of the theory of relativity: a detailed analysis shows that neither energy nor information propagates at a superluminous speed). See for example [1].

These superluminous or far-subluminous propagation speeds are obtained only within very particular optical media, such as atomic vapors, which limits the possible applications of these techniques and makes the implementation thereof complex.

SUMMARY OF THE INVENTION

The invention aims to overcome these drawbacks of the prior art. More particularly, the invention aims to provide a method to control the speed of propagation of an ultrashort laser pulse, over a finite length, in a vacuum or, more generally, in a transparent optical medium without the properties of the latter having to meet particular conditions. As will be discussed below, this makes it possible to envisage entirely novel applications for pulses propagating at speeds substantially different from c.

According to the invention, this result is obtained by making use of space-time couplings of ultrashort laser pulses. The term "ultrashort" is understood to refer to pulses having a duration at half-maximum that is shorter than or equal to 10 ps and preferably than 1 ps, or even 100 fs (femtoseconds; 1 fs=$10^{-15}$ s). The method of the invention is particularly straightforward to implement since it uses only conventional optical elements and is based only on conventional and linear phenomena.

It is well known that, in general, the temporal properties of an ultrashort pulse, such as its temporal intensity profile, depend on the position at which they are measured, and in particular on the distance from the optical axis. Reciprocally, its spatial properties, for example its radial intensity profile, vary with time. These space-time couplings are generally considered to be undesirable, but may sometimes be used to generate attosecond pulses (1 as =$10^{-18}$) [2, 3] or diffraction-free beams [4], or even be used in nonlinear microscopy [5]. However, as far as the inventor is aware, space-time couplings have never been used before to control the speed of ultrashort pulses.

It is worth specifying that, in the context of the invention, the "speed" or "speed of propagation" of a pulse is defined as the speed at which its intensity peak—i.e. the point in space at which, at a given time, the intensity of the pulse is at maximum—moves along an optical axis. In the usual case of propagation in a dispersive medium, it is generally the group velocity of the pulse that is of interest. However, this concept is difficult to define in the presence of significant space-time couplings; as such it will not be used hereinafter.

One subject of the invention is therefore a method for controlling the speed of a laser pulse, comprising:
  a step of applying a chirp to the pulse; and
  a step of focusing the pulse by means of an optical system having a longitudinal chromatic aberration;
  whereby an intensity peak of the pulse moves along a propagation axis following, over a finite propagation length, a speed profile dependent on said chirp and on said longitudinal chromatic aberration.

According to particular embodiments:

The method may further comprise a prior step of determining at least one parameter, chosen from a parameter quantifying said chirp and a parameter quantifying said longitudinal chromatic aberration, according to a target speed profile of said intensity peak of said laser pulse.

More specifically, said prior step may comprise determining at least one parameter quantifying said chirp, said chromatic aberration being considered constant.

The second derivative of the spectral phase $\varphi$ of the laser pulse with respect to the angular frequency $\omega$, $$\frac{\partial^2 \varphi}{\partial \omega^2},$$

quantifying the chirp, and the curvature of the pulse front $\alpha$, quantifying the longitudinal chromatic aberration, may in particular be chosen so as to satisfy the relationship:

$$\frac{\partial^2 \varphi}{\partial \omega^2} = \alpha w_0^2 z_r \left( \frac{1}{v(z)} - \frac{1}{c} \right)$$

where $w_0$ is the waist radius of the laser beam before focusing corresponding to a spectral component at a center frequency of the pulse, which is considered Gaussian, and $z_r$ is its Rayleigh length, c is the speed of light in a vacuum and $v(z)$ is the target speed profile, expressing the speed of movement of the intensity peak of the pulse according to its position z along the propagation axis.

Said pulse may have a duration at half-maximum limited by Fourier transform, $\tau_F$, that is shorter than or equal to 10 ps and preferably shorter than or equal to 1 ps;

The longitudinal chromatic aberration of said optical system may be large enough that $\tau_p \geq \tau_F$, where:
  $\tau_F$ is the duration at half-maximum limited by Fourier transform of the laser pulse;
  $\tau_p = \alpha w_0^2$ where $\alpha$ is the curvature of the pulse front, quantifying the longitudinal chromatic aberration, and $w_0$ is the waist radius of the laser beam before focusing corresponding to a spectral component at a center frequency of the pulse, which is considered Gaussian.

Said chirp may have a third-order component, whereby said intensity peak of the pulse moves along said propagation axis with a constant and nonzero acceleration over said finite propagation length.

Another subject of the invention is the use of such a method for accelerating particles via laser.

Yet another subject of the invention is a system for implementing such a method, comprising:

a laser pulse source having a duration at half-maximum limited by Fourier transform, $\tau_F$, that is shorter than or equal to 10 ps and preferably shorter than or equal to 1 ps;

an optical phase modulator, configured to apply a chirp to said laser pulses; and an optical system for focusing said laser pulses exhibiting a longitudinal chromatic aberration that is large enough that $\tau_p \geq \tau_F$, where $\tau_p = \alpha w_0^2$ where $\alpha$ is the curvature of the pulse front, quantifying the longitudinal chromatic aberration, and $w_0$ is the waist radius of the laser beam carrying the focused pulses, which is considered Gaussian.

Said optical phase modulator is may be suitable for applying an adjustable chirp to said pulses. It may in particular be a dispersive delay line.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

An ultrashort laser pulse necessarily has a wide spectrum; it may therefore be considered to consist of a plurality of spectral components. When the pulse is short enough that its spectral width allows it (it is Fourier transform limited), these various spectral components are in phase, and their spectral phase is constant or linear.

Figure 1:
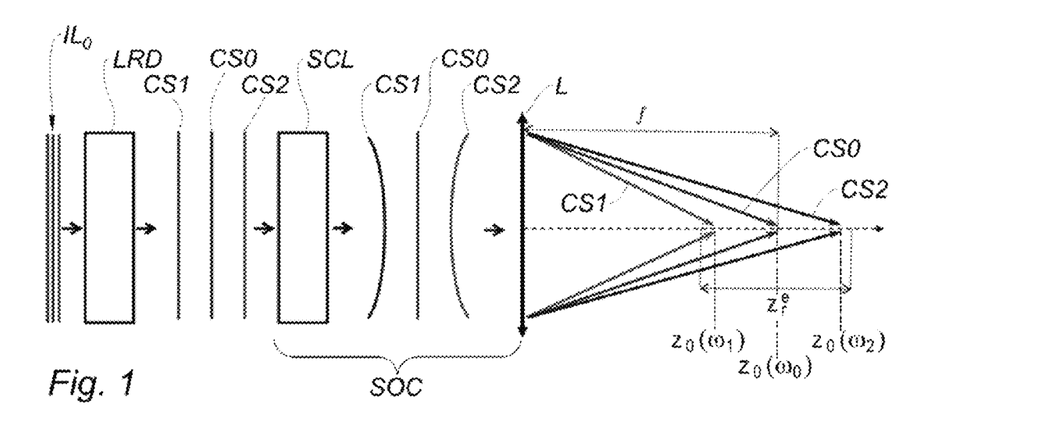
FIG. 1 schematically illustrates the implementation of a method according to one embodiment of the invention.

In FIG. 1, the reference $IL_0$ denotes a collimated (i.e. having a planar wavefront) Fourier transform-limited ultrashort laser pulse, generated for example by a laser oscillator operating in phase-locked mode and, if necessary, being amplified. This pulse $IL_0$ passes through a dispersive delay line LRD, which introduces a frequency-dependent delay. In the spectral domain, this delay results in a non-constant spectral phase; in the time domain, it leads to a variation with time of the instantaneous frequency of the pulse (a chirp). The simplest case is that of a linear chirp, which corresponds to a frequency that varies linearly with time and hence exhibits a quadratic spectral phase:

$$\varphi(\omega) = -\frac{\beta}{2}\delta\omega^2 \qquad (1)$$

where $\delta\omega = \omega - \omega_0$, $\omega_0$ being the center frequency of the laser pulse, and $\beta$ is a parameter quantifying the chirp. It is however possible to consider more complex cases such as for example that of a quadratic chirp, in which the spectral phase is a cubic function of the frequency.

In FIG. 1, this is illustrated schematically by showing three spectral components CS1, having an angular frequency $\omega_1$ and being subject to a delay $\Delta t_1$, CS0, having an angularly frequency $\omega_0$ and being subject to a delay $\Delta t_0$, and CS2, having an angular frequency $\omega_2$ and being subject to a delay $\Delta t_2$, spaced along the optical axis z. Although three discrete spectral components are shown, in reality a laser pulse generally has a continuous spectrum, and hence an infinite number of spectral components.

An optical system SCL (typically an assembly of lenses) having a longitudinal chromatic aberration produces a different curvature of the wavefront for each spectral component. For example, the spectral component CS1, which has been subjected to the longest delay, acquires a positive curvature (it is unfocused), characterized by a radius of curvature $R(\omega_1) > 0$; the spectral component CS0 retains a zero curvature, characterized by an infinite radius of curvature R(coo), and the spectral component CS2, which has been subjected to the shortest delay, acquires a negative curvature (it is focused), characterized by a radius of curvature $R(\omega_2) < 0$. Hereinafter, only the following case will be considered:

$$\frac{1}{R(\omega)} = 2c\alpha \frac{\delta\omega}{\omega_0} \qquad (2)$$

$\alpha$ being a parameter quantifying the longitudinal chromatic aberration; this relationship is valid provided that $\delta\omega \ll \omega_0$ (for example $\omega_0 \geq 10 \cdot \delta\omega$). Under these conditions, "curvature of the pulse front" is spoken of, since in the time domain this aberration results in a pulse delay that is quadratically dependent on the distance |r| from the optical axis; thus, the pulse envelope A(t,r) is a function of $t - \alpha|r|^2$ only: $A(t - \alpha|r|^2)$. It is also possible to consider more complex cases, in which $1/R(\omega)$ is a non-linear function of $\omega$ and the space-time coupling can no longer be expressed by a single parameter $\alpha$, but this complicates the theoretical treatment.

Next, an achromatic lens L (or a mirror, which is intrinsically achromatic) having a focal length f focuses the various spectral components onto its optical axis z. Together, the system SCL and the lens L form what might be called a chromatic optical system SOC.

The various spectral components exhibit, upstream of the lens L, wavefronts having different curvatures; thus, they are focused at different points of the axis z. More specifically, the component CS1 is focused upstream of the focal point of the lens, CS0 corresponding to this focal point and CS2 downstream thereof. The term "extended Rayleigh length", denoted by the symbol $z_r^e$, refers to the length over which the focal points $z_0(\omega)$ of the various spectral components of the pulse are spread.

Additionally, these spectral components are focused at different times: this is due both to the fact that they must traverse paths of different length and to the delay introduced by the dispersive line LRD. Each spectral component forms, at the place and time of optimal focus thereof, an intensity peak. By varying the chirp and the curvature of the pulse front, it is possible to control the speed at which this peak moves inside the extended Rayleigh length.

This may be understood with the aid of FIGS. 2A-2D, which are graphs in which the abscissa axis represents time and the ordinate axis represents the position along the axis z. Horizontal lines represent the optimal focal points of the various spectral components: $z_0(\omega_1)$, $z_0(\omega_0)$, $z_0(\omega_2)$. Oblique arrows represent the propagation of the various spectral components; these components all propagate at one and the same speed, the speed of light c; as such, the arrows are parallel and have one and the same slope, the value of which is precisely "c". The point of intersection between the horizontal line and the oblique arrow representing one and the same spectral component corresponds to the position and to the time of optimal focus of said spectral component. The various points of intersection form a line P, which represents the trajectory of the intensity peak along the axis z. The local slope of this line represents the instantaneous speed of the pulse.

Figure 2A:
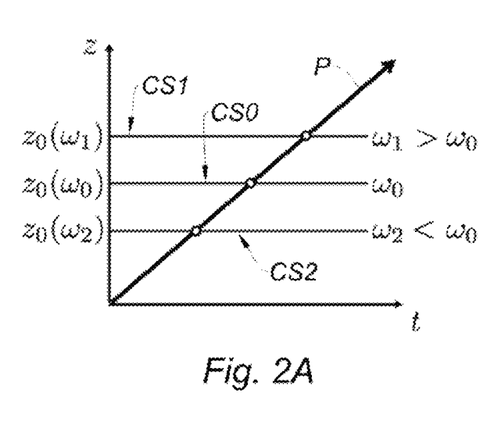
FIGS. 2A to 2D show graphs intuitively illustrating how the combination of a chirp and of a curvature of the pulse front, resulting from a longitudinal chromatic aberration, can determine the speed of propagation of an ultrashort pulse.

FIG. 2A relates to the case—which is not derived from the invention—of a chirpless pulse. The line P and the arrows representing the propagation of the various spectral components are superposed. The intensity peak propagates at the speed c.

Figure 2B:
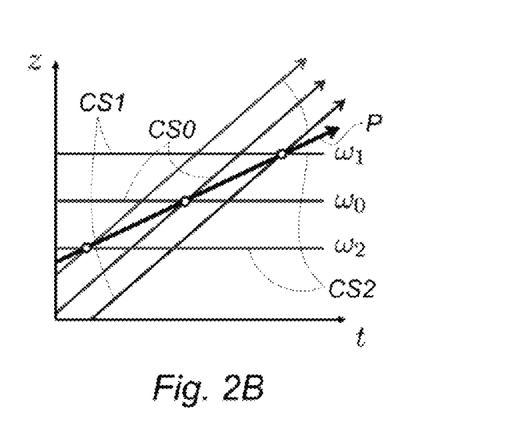

FIG. 2B relates to the case of a linear chirp, which is shown by the fact that the arrows representing the propagation of the various spectral components are no longer superposed. In this specific case, the spectral components that are focused at the distances furthest from the lens are also those which have been subjected to the longest delays. This results in a speed of propagation of the intensity peak that is slower than c.

Figure 2C:
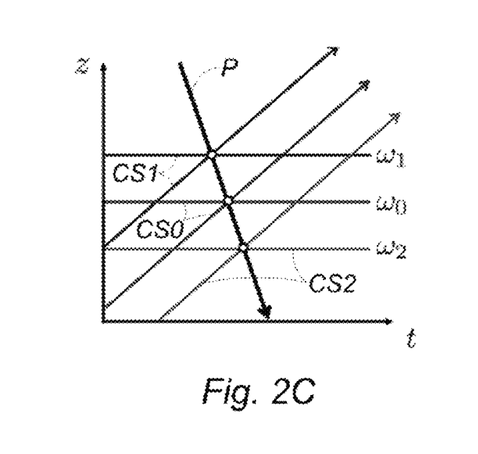

FIG. 2C also corresponds to the case of a linear chirp, but this time the spectral components that are focused at the distances furthest from the lens are those which have been subjected to the shortest delays. Under these conditions, the speed of propagation of the intensity peak is negative, and has an absolute value that is higher than c. Concretely, an intensity peak appears at a distance from the lens that is greater than f, propagates (in this case, at superluminous speed) toward the lens over a length $z_r^e$, then it is attenuated until it disappears.

Figure 2D:
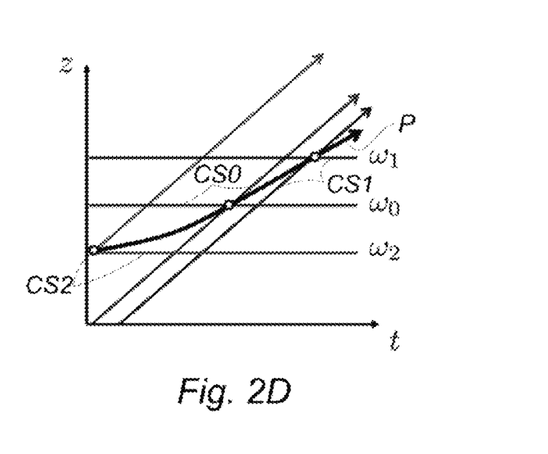

FIG. 2D differs from FIG. 2B in that the chirp is no longer linear, but quadratic (spectral phase comprising a third-order component). This is shown by the fact that the arrows representing the propagation of the various spectral components are not spaced apart regularly, even though $\omega_2 - \omega_0 = \omega_0 - \omega_1$. Under these conditions, over the extended Rayleigh length, the intensity peak moves over the axis z with a constant acceleration, and hence an increasing speed.

Of course, other configurations are possible: positive and superluminous speed, negative and subluminous speed, time-variable acceleration, or even a limited case of infinite speed.

A semi-quantitative study of the method of the invention may be conducted by virtue of a simplified model in the case of a linear chirp and of a longitudinal chromatic aberration resulting in a curvature of the pulse front. The electric field of the pulse may be written as:

$$E(r,t) = \exp(i\omega_0 t) A_0(t - \alpha |r|^2) \quad (3)$$

where r is the position vector in a plane perpendicular to the axis z and $A_0$ is the complex envelope of the pulse, comprising in particular a phase term $$-\frac{\beta}{2}\delta\omega^2$$

corresponding to the chirp. It is worth noting that, at the radial position $|r| = w_0$ ($w_0$ being the waist width of the laser beam carrying the pulse, which is assumed to be Gaussian) the pulse is delayed by $\tau_P = \alpha w_0^2$.

By calculating the Fourier transform of (3) the following is obtained:

$$E'(r,\omega) = \exp(-i\alpha\delta\omega|r|^2) A'_0(\delta\omega) \quad (4)$$

The spatial phase according to the frequency co may be written as $$\varphi(r, \omega) = -\frac{\omega|r|^2}{2cR(\omega)} \quad (5)$$

where $$\frac{1}{R(\omega)} = 2c\alpha \frac{\delta\omega}{\omega 0} \quad (6)$$

is the curvature of the wave front according to the frequency (like in the case of equation (2), it is assumed that $\delta\omega \ll \omega_0$).

After focusing by the lens L of focal length f, the curvature of the wave front becomes R'($\omega$) where $1/R'(\omega) = 1/R(\omega) - 1/f$. If the beam incident on the lens is near-collimated, R($\omega$)$\gg$f (for example, R($\omega$)$\geq$10·f) and hence $$R'(\omega) \cong -f - \frac{f^2}{R(\omega)} \quad (7)$$

A spectral component of angular frequency co is focused on a point $z_0(\omega)$ at a distance $-R'(\omega)$ from the lens. Taking, by convention, $z_0(\omega_0) = 0$ and assuming $\delta\omega \ll \omega_0$ (for example, $\delta\omega < -\omega_0/10$) it is possible to write:

$$z_0(\omega) = 2f^2 c\alpha \frac{\delta\omega}{\omega_0} = \tau_P z_r \delta\omega \quad (8)$$

where $z_r = \lambda_0 f^2/\pi w_0^2$ is the Rayleigh length, $\lambda_0$ being the wavelength corresponding to the angular frequency $\omega_0$. It is worth noting that when instead $\tau_P \gg \tau_F$, or else $\alpha \gg \tau_P/w_0^2$ (for example, $\tau_P \geq 5 \cdot \tau_F$), $z_r^e/z_r = \tau_P \propto \tau_P/\tau_F$, $\tau_F$ being the duration of the pulse limited by Fourier transform and $\Delta\omega$ being the spectral width (for example, the full width at half-maximum) of the pulse.

The presence of a linear chirp is now considered, which up until now was "hidden" in the phase of the complex envelope $A_0$ of the pulse. This chirp corresponds to a spatially uniform spectral phase $$-\frac{\beta}{2}\delta\omega^2.$$

High values of the parameter $\beta$ ($\beta \gg \tau_F^2$, for example, $\beta \geq 5 \cdot \tau_F^2$) impose a linear relationship between the frequency and the time of arrival of a spectral component at its focal point. Thus, the spectral frequency component $\omega$ arrives at the position $z_0(\omega)$ at time:

$$t_0(\omega) = -\frac{\partial \varphi(z_0, \omega)}{\partial \omega} = \frac{z_0(\omega)}{c} + \beta \delta \omega \quad (9)$$

By combining equations (8) and (9), it is possible to find the speed of propagation of the pulse peak, v, such that $z_0 = vt_0$ for all frequencies $\omega$:

$$v = \frac{c}{1 + \frac{\omega_0}{zf^2} \cdot \frac{\beta}{\alpha}} \quad (10)$$

Figure 3:
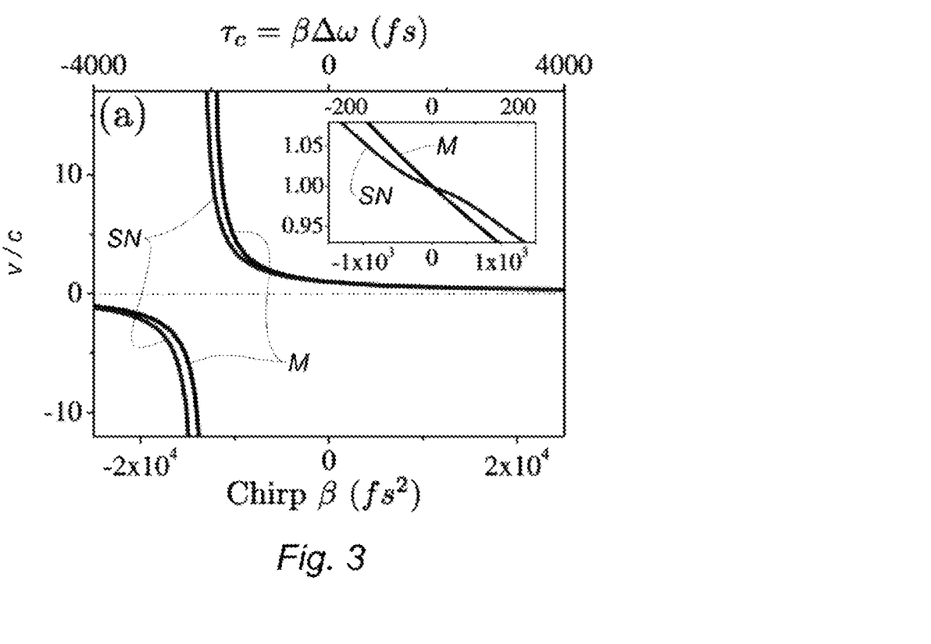
FIG. 3 shows a graph expressing the speed of propagation of a laser pulse according to invention according to its chirp, which is assumed to be linear, and for a given curvature of the pulse front.

FIG. 3 is a graph of the speed v according to the chirp parameter $\beta$ (or, equivalently, of $\tau_c = \beta \cdot \Delta \omega$, duration of the pulse in the presence of a substantial chirp) for $\alpha = 3$ fs/cm$^2$, $$\lambda_0 = 2\pi \frac{c}{\omega_0} = 800 \text{ nm},$$

f=1 m. The curve M corresponds to the value calculated by applying equation (10), while the curve SN has been obtained by computer simulation. The insert shows a detailed view of these curves for low values of $\beta$. It can be seen that, despite its simplicity, the theoretical model disclosed above constitutes a good approximation of reality.

Equations (9) and (10) may be generalized to the case of a non-linear chirp, i.e. of an arbitrary spectral phase:

$$\frac{\partial^2 \varphi}{\partial \omega^2} = \alpha w_0^2 z_r \left( \frac{1}{v(z)} - \frac{1}{c} \right) \quad (11)$$

where v(z) is related to $\omega$ by equation (8):

$$v(z) = v(\tau_P z_r \delta_\omega) = v\left(2f^2 c\alpha \frac{\delta \omega}{\omega_0}\right).$$

Equation (10) may be used to determine the chirp (expressed by $$\frac{\partial^2 \varphi}{\partial \omega^2}\Big)$$

and the longitudinal chromatic aberration (quantified by $\alpha$), which make it possible to obtain a desired speed profile according to the coordinate z. In practice, most commonly, the curve parameter of the pulse front $\alpha$ will be considered fixed and equation (10) will be used to determine $$\frac{\partial^2 \varphi}{\partial \omega^2}$$

on the basis of a target speed profile v(z).

The principle of the invention has been validated by virtue of computer simulations.

Figure 4:
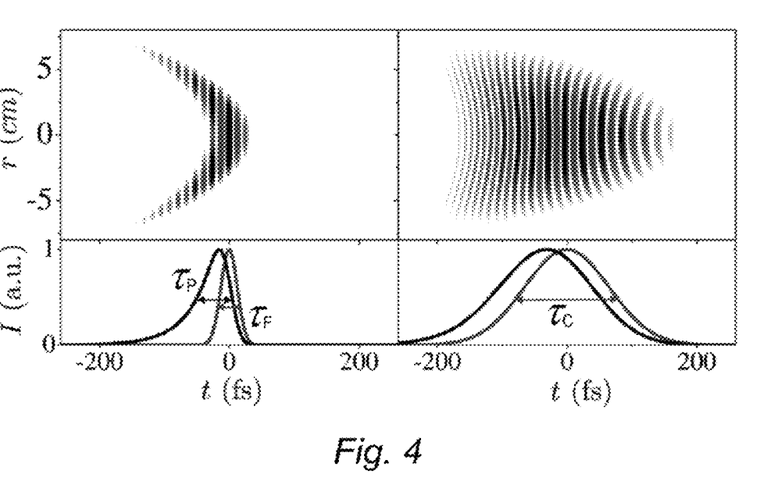
FIGS. 4 and 5 show graphs illustrating the properties of an ultrashort pulse exhibiting both a chirp and a curvature of the pulse front.

The top-left portion of FIG. 4 shows the space-time electric field of a chirpless pulse having a curvature of the pulse front $\alpha = 3$ fs/cm$^2$ (the optical frequency has been decreased for the sake of visibility) and a waist width before focusing $w_0 = 5$ cm. It is observed that the pulse takes a curved shape in the plane (z,r), for which reason it is referred to as the "curvature of the pulse front". The "local" duration of the pulse, measured at its center (r=0), has a value of $\tau_F = 25$ fs; because of the curvature of the pulse front, however, the spatially integrated duration has a value of approximately $\tau_P = 75$ fs. This is illustrated by the bottom-left portion of the figure.

The top-right portion of the figure shows the space-time electric field of this same pulse after the introduction of a linear chirp of parameter $\beta = -6380$ fs. Under these conditions, CPLC pulses are spoken of, which are chirped pulses with longitudinal chromatism.

The bottom-right portion of the figure shows the temporal intensity profile of the pulse on the axis (black curve) and having been temporally integrated (gray curve); in both cases, the duration of the pulse is substantially equal to $\tau_c = |\beta| \cdot \Delta \omega$. The intensity is expressed in arbitrary units (a.u.).

Figure 5:
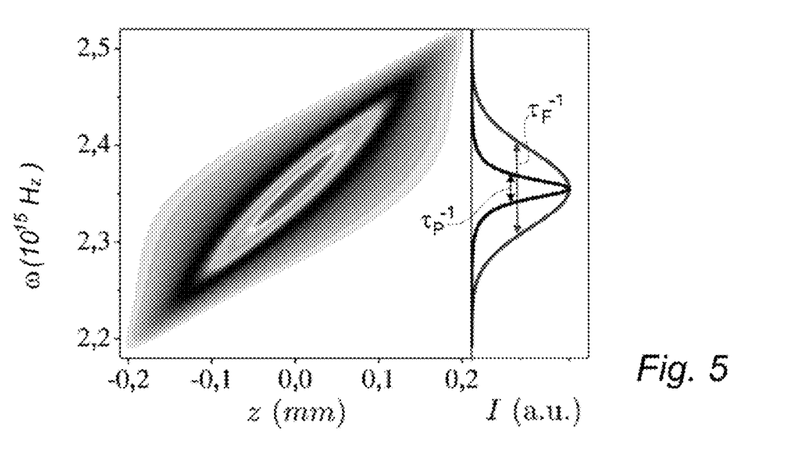

FIG. 5 shows the spectrum of the focused pulse according to the longitudinal coordinate z. The "longitudinal chirp", i.e. the fact that the different spectral components are focused at different positions along the axis z, is clearly visible. The curves on the right of the figure represent the spectrum at z=0 (black curve, spectral width of the order of $1/|\tau_P|$) and having been spatially integrated (grey curve, spectral width of the order of $1/\tau_F$).

Figure 6:
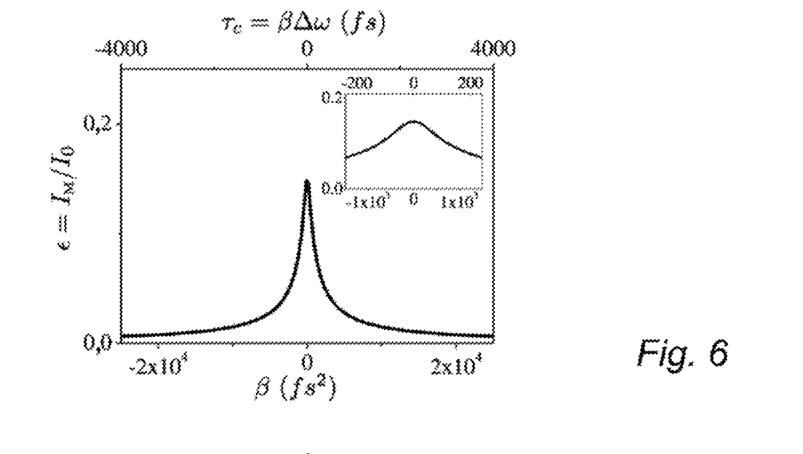
FIGS. 6 and 7 show graphs illustrating the loss in intensity of the pulses caused by the implementation of the method of the invention.

The simulations (although this result may also be found by virtue of a theoretical analysis that is more in depth than the simple model disclosed above) have made it possible to demonstrate the fact that the peak intensity $I_M$ of the focused CPLC pulse becomes lower as the chirp parameter $\beta$ increases. This is illustrated by FIG. 6. A comparison with FIG. 3 shows that a propagation speed that is much faster or slower than c, or even negative, is obtained at the cost of a decrease in the peak intensity (quantified by the parameter $$\epsilon = \frac{I_M}{I_0},$$

$I_0$ being the peak intensity of the focused pulse in the absence of a chirp and chromatic aberration) by one or even two orders of magnitude. This drawback of the invention should however be put into perspective, since nowadays it is possible to generate femtosecond pulses having a peak power of the order of hundreds of terawatts (1 TW=$10^{12}$ W), or even several petawatts (1 PW=$10^{15}$ W), which allow, once focused, considerable intensities to be reached (>$10^{21}$ W/cm$^2$).

The longitudinal chromatic aberration also affects the maximum peak intensity of the CPLC pulse. This is demonstrated by FIG. 7, which shows the dependency on $\alpha$ (bottom scale) or, equivalently, of $\tau_P$ (top scale) of the reduction parameter of the peak intensity $\epsilon$ for three different values of the absolute value of $(\beta/\alpha)$ (and hence five different propagation speeds: v=c ($\beta/\alpha=0$), v=0.91·c or 1.1·c ($\beta/\alpha=\pm 7.71 \cdot 10^2$ fs·cm$^2$), v=0.81·c or 1.3·c ($\beta/\alpha=\pm 1.95 \cdot 10^3$ fs·cm$^2$)). The curves $\epsilon(\alpha)$ are shown in dotted lines for $\alpha<0.5$ fs/cm², since the model described above is not applicable for overly low values of the parameter $\alpha$.

Figure 7:
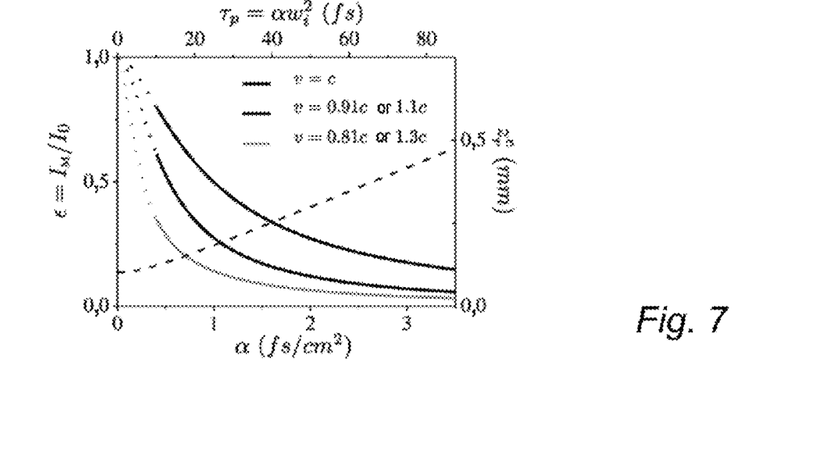

Additionally, the extended Rayleigh length $z_r^e$ increases with $\alpha$, as illustrated by the dashed line in this same FIG. 7. It is worth noting that $z_r^e \to z_r$ for $\alpha \to 0$ (equation 8, according to which $z_r^e$ is proportional to a, is not applicable for low $\alpha$). It can thus be seen that a variation of +30%/−20% in the speed of propagation of the pulse with respect to the case v=c may be obtained, over an extended Rayleigh length of several hundreds of nanometres, at the cost of a loss in peak intensity by around a factor 100.

Keeping, for the sake of simplicity, to the case of a linear chirp, the speed of the pulse is determined by the value of the ratio $\beta/\alpha$ (equation 10). An infinite number of pairs of values of the parameters $\alpha$ and $\beta$ therefore makes it possible to obtain a given target speed. The choice of a particular pair of values is typically the result of a trade-off between the intensity of the peak of the focused pulse and the extended Rayleigh length—two criteria that it is often desired to maximize. Most commonly, $\alpha$ will be chosen such that $\tau_p \geq \tau_F$. Observing this condition ensures that $z_r^e$ is substantially higher than $z_r$.

Figure 8A:
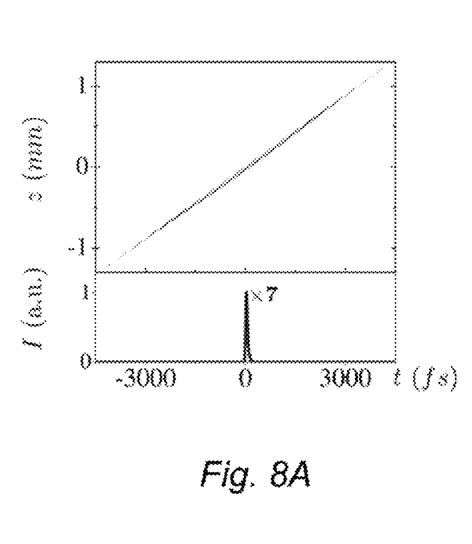
FIGS. 8A-8E show graphs illustrating pulses, obtained according to the invention, exhibiting various constant (8A-8C) or non-constant (8D, 8E) speeds of propagation.

FIGS. 8B to 8E show simulations of CPLC pulses according to various embodiments of the invention. FIG. 8A, given by way of comparison, corresponds to a chirpless pulse having a curvature of the pulse front of parameter $\alpha$=3 fs/cm², which therefore propagates at a speed c; this situation may be likened to that of FIG. 2A.

The top panels of the various figures show the space-time intensity profiles of the pulses on the optical axis, the bottom panels show their temporal profiles on the axis, multiplied by the coefficient $\epsilon^{-1}$, the value of which is indicated in each figure, for the sake of visibility. In all cases, $\lambda_0$=800 nm, $w_0$=5 cm, f=1 m, $\tau_F$=25 fs. The parameter $\alpha$=3 fs/cm² ($\tau_P$=75 fs) except in the case of FIG. 8E, where $\alpha$=30 fs/cm² ($\tau_P$=750 fs).

Figure 8B:
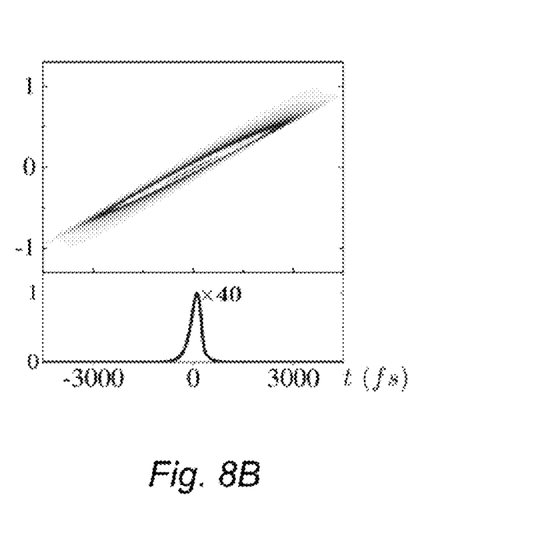

FIG. 8B represents the case in which $\beta$=12.230 fs², which corresponds to a subluminous speed v=0.7c. This situation may be likened to that of FIG. 2B.

Figure 8C:
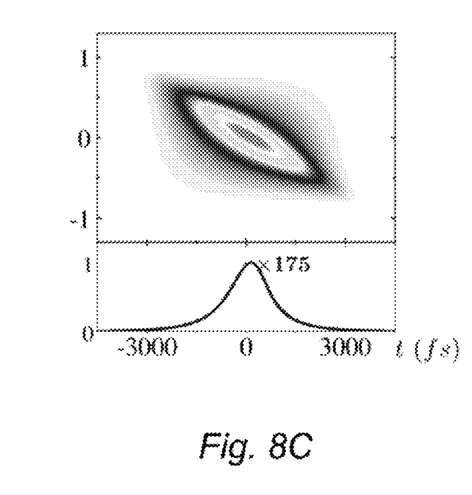

FIG. 8C shows the case in which $\beta$=−53.420 fs², which corresponds to a negative speed v=−c. This situation may be likened to that of FIG. 2C.

Figure 8D:
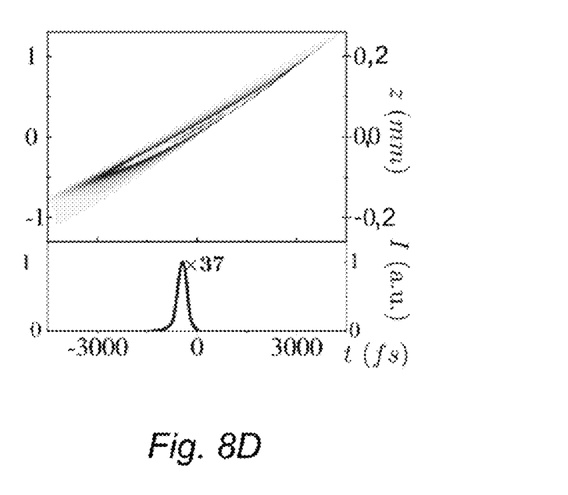

FIG. 8D shows the case in which the pulse exhibits a third-order spectral phase, i.e. a quadratic chirp: the pulse propagates with a uniform acceleration, like in the case of FIG. 2D.

Figure 8E:
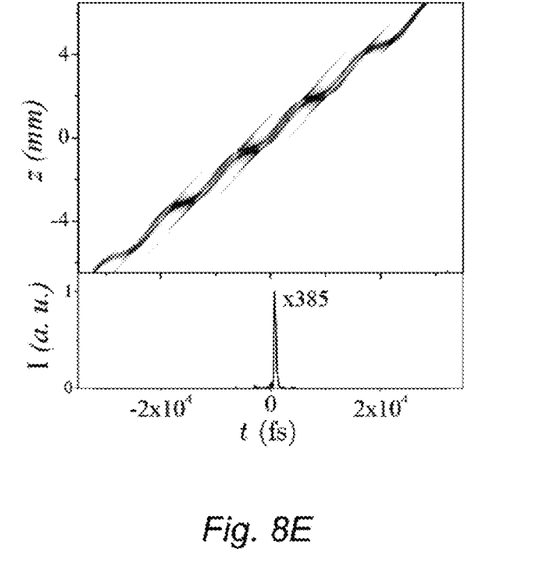

In the case of FIG. 8E, the pulse exhibits an oscillating spectral phase, resulting in a speed of propagation exhibiting oscillation between 0.3·c and c.

Figure 9:
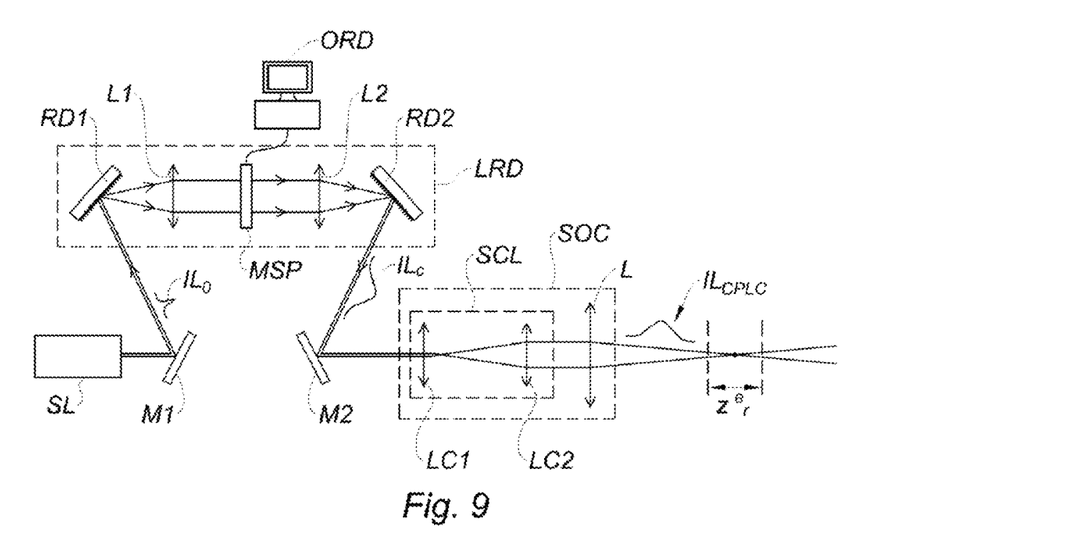
FIG. 9 shows the diagram of an optical system according to one embodiment of the invention.

FIG. 9 schematically illustrates a system according to one embodiment of the invention.

A laser source SL generates ultrashort laser pulses, the duration at half-maximum limited by Fourier transform, $\tau_F$, of which is typically shorter than or equal to 10 ps, or even 1 ps. The source SL generally comprises a femtosecond laser oscillator, most commonly a Ti:sapphire oscillator operating in phase-locked mode, and an amplification chain.

The pulses $IL_0$ generated by the source SL are directed, via a mirror M1, toward the dispersive delay line LRD. In the embodiment of FIG. 9, this is a programmable line, comprising a first diffraction grating (or prism) RD1 that separates the various spectral components of the incident light, a first lens L1 for collimating the beam dispersed by the grating, a liquid-crystal spatial phase modulator MSP, and a second lens L2 for focusing the beams onto a second diffraction grating (or prism) RD2, which recombines the various spectral components. A computer ORD controls the liquid-crystal spatial phase modulator MSP so as to dephase each spectral component of the laser beam in a controlled manner. This makes it possible to obtain an arbitrary, linear or non-linear, chirp.

A second mirror M2 directs the pulses with chirp $IL_c$ that arise from the dispersive delay line toward the chromatic optical system SOC. The latter is formed by an afocal optical system SCL, consisting of two lenses LC1, LC2 exhibiting a substantial longitudinal chromatic aberration, and a focusing lens L, which is substantially achromatic. The reference $IL_{CPLC}$ denotes the pulse with chirp and curvature of the pulse front focused by the lens L.

Numerous variants are possible.

For example, a linear chirp may be introduced by a simple dispersive delay line using prisms or diffraction gratings, without having to use a spatial phase modulator. Furthermore, such delay lines are generally present in the amplification chain forming part of the laser source, and may be used to obtain the chirp required to implement the invention (before amplifying ultrashort laser pulses, it is common practice to stretch them out by introducing a linear chirp, then to recompress them before amplification). A substantially linear chirp may also be obtained by propagating the pulse through a dispersive medium.

A dispersive delay line is not the only element that is able to introduce a chirp, linear or otherwise. One alternative consists in modulating the temporal phase of the pulse by means of an acousto-optic modulator used as an acousto-optic programmable dispersive filter (AOPDF). In fact, any device making it possible to modulate the optical phase of a pulse may be suitable for implementing the invention.

The chromatic optical system SOC may also have a different structure from that shown in FIG. 9. For example, it may be a simple chromatic lens, both focusing and adding the curvature to the wavefront.

Most commonly, the longitudinal chromatic aberration of the system SOC is fixed, being determined by the structure and the constituent materials of the lenses making it up. The parameter $\alpha$ can therefore only be modified, discontinuously, by changing these lenses. It is however possible to use a spatial light modulator and a deformable mirror to obtain a chromatic system SOC, the longitudinal chromatic aberration of which may be finely controlled; in this regard see [6].

The invention may be applied, in particular, to the acceleration of particles (electrons or ions) by laser ([7]). For example, the generation of "slow" laser pulses (having a speed v that is substantially slower than c, for example at least 10% or even 20% slower, or more) may facilitate the acceleration of ions, while finely adjusting the speed of propagation of the pulses around c may be advantageous for the Wakefield acceleration of relativistic electrons. Both in the case of ions and in that of electrons, the injection of particles is facilitated by using pulses of nonconstant speed increasing over time.

REFERENCES

[1] W. Milonni "*Controlling the speed of light pulses*", J. Phys. B: At. Mom/Opt. Phys 35 (2002), R31-R56
[2] H. Vincenti and F. Quéré, "*Attosecond lighthouses: how to use spatiotemporally coupled light fields to generate isolated attosecond pulses*", Phys. Rev. Lett. 108, 113904 (2012).
[3] WO 2012/164483 "Method and device for generating isolated attosecond pulses".

[4] H. E. Kondakci, A. F. Abouraddy, "*Diffraction-free pulsed optical beams via space-time correlations*", Opt. Express 24, 28659 (2016).
[5] D. Oron, E. Tal, Y. Silberberg "Scanningless depth-resolved microscopy", Opt. Express 13, 1468 (2005).
[6] B. Sun, P. S. Salter, M. J. Booth "*Pulse front adaptative optics: a new method for control of ultrashort laser pulses*", Optics Express Vol. 23, No. 15 (2015).
[7] E. Esarey, C. B. Schroeder, W. P. Leemans "*Physics of laser-driven plasma-based electron accelerators*", Reviews Of Modern Physics, Vol. 81 (2009).

The invention claimed is:

1. A method for controlling the speed of a laser pulse comprising:
   a step of applying a chirp to the pulse ($IL_0$); and
   a step of focusing the pulse by means of an optical system (SOC) having a longitudinal chromatic aberration;
   whereby an intensity peak of the pulse ($IL_{CPLC}$) moves along a propagation axis (z) following, over a finite propagation length ($z_r^e$), a speed profile dependent on said chirp and on said longitudinal chromatic aberration.

2. The method as claimed in claim 1, further comprising a prior step of determining at least one parameter, chosen from a parameter ($\beta$) quantifying said chirp and a parameter ($\alpha$) quantifying said longitudinal chromatic aberration, according to a target speed profile of said intensity peak of said laser pulse.

3. The method as claimed in claim 2, wherein said prior step comprises determining at least one parameter quantifying said chirp, said chromatic aberration being considered constant.

4. The method as claimed in claim 2, wherein the second derivative of the spectral phase $\varphi(\omega)$ of the laser pulse with respect to the angular frequency $\omega$, $$\frac{\partial^2 \varphi}{\partial \omega^2},$$

quantifying the chirp, and the curvature of the pulse front $\alpha$, quantifying the longitudinal chromatic aberration, are chosen so as to satisfy the relationship:

$$\frac{\partial^2 \varphi}{\partial \omega^2} = \alpha w_0^2 z_r \left( \frac{1}{v(z)} - \frac{1}{c} \right)$$

where $w_0$ is the waist radius of the laser beam before focusing corresponding to a spectral component at a center frequency of the pulse, which is considered Gaussian, and $z_r$ is its Rayleigh length, c is the speed of light in a vacuum and v(z) is the target speed profile, expressing the speed of movement of the intensity peak of the pulse according to its position z along the propagation axis.

5. The method as claimed in claim 1, wherein said pulse ($IL_0$) has a duration at half-maximum limited by Fourier transform, $\tau_F$, that is shorter than or equal to 10 ps and preferably shorter than or equal to 1 ps.

6. The method as claimed in claim 1, wherein the longitudinal chromatic aberration of said optical system (SOC) is large enough that $\tau_p \geq \tau_F$, where:
   $\tau_F$ is the duration at half-maximum limited by Fourier transform of the laser pulse;
   $\tau_p = \alpha w_0^2$ where $\alpha$ is the curvature of the pulse front, quantifying the longitudinal chromatic aberration, and $w_0$ is the waist radius of the laser beam before focusing corresponding to a spectral component at a center frequency of the pulse, the laser beam being considered Gaussian.

7. The method as claimed in claim 1, wherein said chirp is such that the spectral phase of the laser pulse has a third-order component with respect to frequency, whereby said intensity peak of the pulse moves along said propagation axis with a constant and nonzero acceleration over said finite propagation length.

8. The use of a method as claimed in claim 7 for accelerating charged particles via laser.

9. A system for implementing a method as claimed in claim 1, comprising:
   a laser pulse source (SL) having a duration at half-maximum limited by Fourier transform, $\tau_F$, that is shorter than or equal to 10 ps and preferably shorter than or equal to 1 ps;
   an optical phase modulator (LRD), configured to apply a chirp to said laser pulses; and
   an optical system (SOC) for focusing said laser pulses exhibiting a longitudinal chromatic aberration that is large enough that $\tau_p \geq \tau_F$, where $\tau_p = \alpha w_0^2$ where $\alpha$ is the curvature of the pulse front, quantifying the longitudinal chromatic aberration, and $w_0$ is the waist radius of the laser beam carrying the focused pulses, the laser beam being considered Gaussian.

10. The system as claimed in claim 9, wherein said optical phase modulator is suitable for applying an adjustable chirp to said pulses.

11. The system as claimed in claim 9, wherein said optical phase modulator is a dispersive delay line.

* * * * *